Aug. 15, 1961   G. W. BEHNKE ET AL   2,996,148
OILING SYSTEM FOR OSCILLATING ASSEMBLIES
Filed June 26, 1959   2 Sheets-Sheet 2

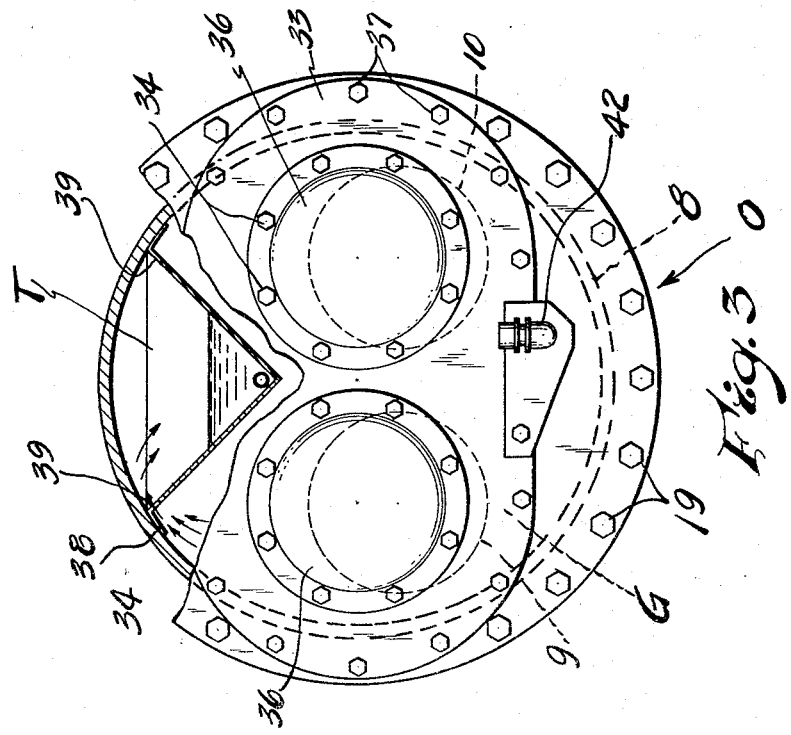
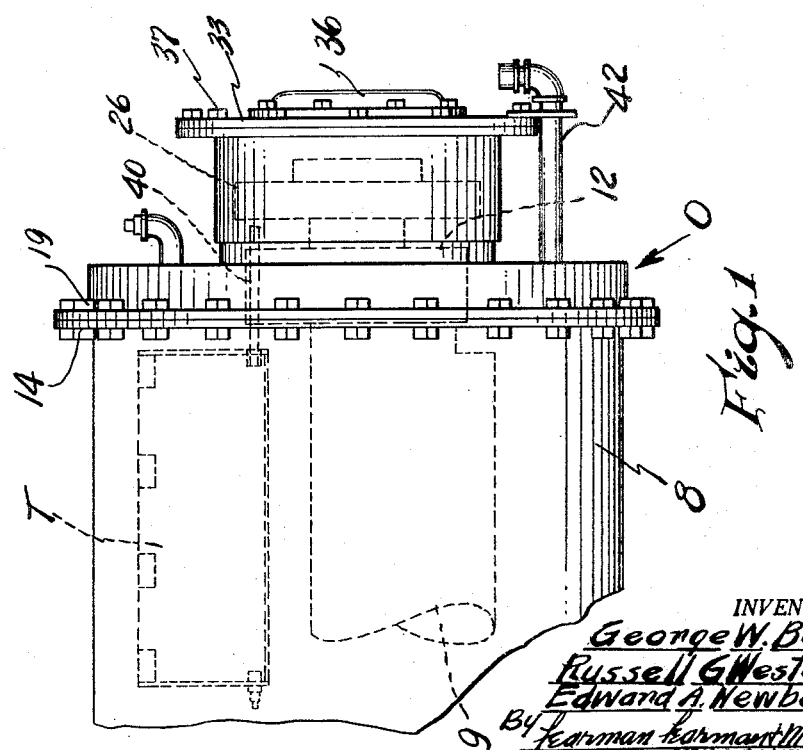

INVENTORS
George W. Behnke.
Russell G. Westcott.
Edward A. Newberry.
By Pearman, Pearman & McCulloch
ATTORNEYS

United States Patent Office 2,996,148
Patented Aug. 15, 1961

2,996,148
OILING SYSTEM FOR OSCILLATING ASSEMBLIES
George W. Behnke, Russell G. Westcott, and Edward A. Newberry, Durand, Mich., assignors to Simplicity Engineering Company, Durand, Mich., a corporation of Michigan
Filed June 26, 1959, Ser. No. 823,068
3 Claims. (Cl. 184—11)

This invention relates to means and method of lubricating oscillating assemblies such as used in connection with vibrating mechanism and assemblies of a similar nature.

One of the prime objects of the invention is to design an oiling system operable in cold climates, for supplying oil to the bearings and gears of the mechanism for a period of time after the machine is started, and until such time as the temperature of the assembly has reached its normal operating range, said system providing an adequate supply or volume of oil regardless of the temperature during the shutdown or idle period, and without use of a pump or other circulating means.

Heretofore, lubrication of the bearings in the unit was dependent upon the driven shaft, or shafts, agitating the oil supply sufficiently to splash it into the bearings, and while this is adequate and satisfactory in warm weather, it is not satisfactory in cold climates and regions where oil congeals and does not flow freely as occurs after an all-night or a weekend shutdown. During such period, and until the temperature of the assembly and oil has reached its normal operating temperature, there is the possibility that the bearings might not have the necessary supply of oil to provide proper lubrication and that the mechanism might be otherwise damaged, as it is necessary that the oil level in the housings on the drive and float end of the unit be maintained at a level approximately to the centerline of the rollers in the bearing and we have therefore developed a very simple, practical and inexpensive means and method insuring an ample supply to the assembly in cold weather and during the time required to bring the assembly up to its normal temperature range.

The most satisfactory oiling system is one employing a circulating pump, and in such system, the oil is forced to circulate through the bearings, etc. from a reservoir to the pump through the bearings, etc., and thence back to the reservoir. However, a pump is a source of maintenance and replacement, and in the event of failure there would be inadequate lubrication until discovery of the failure, bearings would freeze and costly damages incurred, and our system therefore, provides a very simple apparatus and method which requires no driving means for accomplishing adequate lubrication, and without use of a circulating oil pump or other driven means.

With the above and other objects in view, the present invention consists in the combination and arrangement of parts hereinafter more fully described and illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:

FIG. 1 is a fragmentary, side elevational view of an oscillating shaft assembly showing also our new lubricating means.

FIG. 3 is an end elevational view of the oscillating shaft assembly, parts being broken away to show the oil tank.

Figure 2:
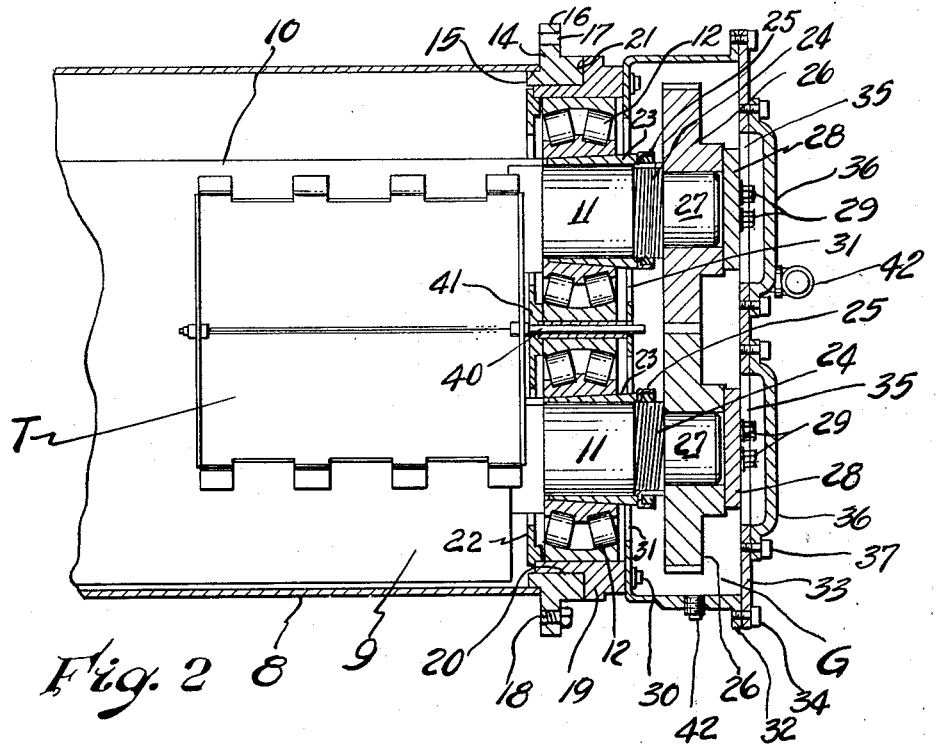
FIG. 2 is an enlarged fragmentary sectional side view of the mechanism shown in FIG. 1.
Figure 4:
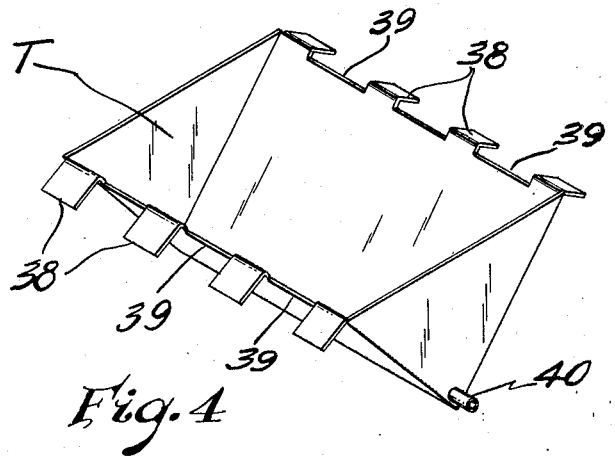
FIG. 4 is a perspective view of the oil tank container.

Referring now more specifically to the drawings in which we have shown the preferred embodiment of our invention.

The numeral 8 indicates a cylindrical housing of an oscillatory assembly O in which a pair of driven counterbalanced shafts 9 and 10 are mounted, the ends of the shafts being turned as at 11 and are journaled in bearings 12 as usual. A flanged ring 14 is mounted on the end of the housing 8, being turned as at 15 to accommodate the end of the housing with a flange 16 projecting outwardly as shown, and a plurality of openings 17 are provided therein to accommodate bolts 18 for securing the housing to the side plates of the screen (not shown), in the usual manner. A shouldered bearing or cage ring 19 is mounted in the flange 14, the shouldered end 20 being secured in facial contact with the outer face 21 of the ring 14, and a shouldered plate 22 engages the inner end of the bolting ring for securing the bearings in position.

A tapered sleeve 23 forms a part of each bearing 12, and an outer threaded section 24 is provided on each shaft adjacent to section 11, with a nut 25 provided as shown, for securing the tapered sleeves in position. Intermeshing gears 26 are provided on the reduced turned ends 27 of the shafts 9 and 10, and end discs 28 are secured thereto by means of studs 29.

A gear housing G forms an oil reservoir and a closure for the gears 26, being bolted to the ring 19 by means of bolts 30, the inner face of the housing having openings 31 as shown to permit oil to flow freely through the bearings and into the housing, and under normal conditions the oil level in the reservoir should be approximately to the centerline of the rollers of the bearings.

The front of the gear housing is flanged as at 32, and a cover plate 33 is secured thereto by means of bolts 34. Access openings 35 are provided in the front end of said cover and plates 36 are fitted thereover and are secured in position by means of studs 37, thus forming a leakproof closure for the ends of the assembly.

A preferably triangular shaped tank T is welded or otherwise secured to the inner face of the housing 8, said tank being formed with a plurality of spaced apart offset ears 38, which ears are welded to the inner face of the housing, the upper edges 39 of the tank side walls, between the ears, forming passages so that oil splashed up by the driven shafts 9 and 10 in the housing will be trapped in the tank T; a discharge pipe 40 being mounted in a bearing 41 provided on one end of the tank at the bottom, said pipe leading through the bearing trough and into the gear housing all as clearly shown in FIG. 2 of the drawings.

The tank T is filled as the machine is operated and when, in cold weather, the mechanism is shut down at the end of the day or over the weekend, this volume of oil, trapped in the tank, drains into the gear housing, furnishing sufficient oil, when the mechanism is started, to provide an adequate supply of lubricant to the bearings and gears until the oil in the unit flows freely, thus greatly increasing bearing and gear life. It will be noted that there are oil intake openings 39 on opposite sides of the tank so that the device is operable regardless of the direction of rotation of the shafts.

A drain plug 42 is provided in the housing G to permit draining when necessary.

The tank has capacity sufficient to provide lubrication for at least an hour of machine operation, after which the temperature of the assembly will be up to approximately its normal operating range.

In practice the oil enters the tank through the slot openings 39, and when the machine ceases operation, this oil from the tank drains through pipe 40 into the gear housing G and there remains, so that when the machine is started, there will be sufficient oil in the housing to provide ample lubrication for at least an hour or more, after which the oil in the machine will be up to its normal temperature range and sufficiently warm to be splashed and circulated in the usual manner.

The oil tank T can be readily cleaned by first removing the pipe plug D in the one end of the tank. With this plug removed, it is possible to flush and clean tank T when desired.

From the foregoing description, it will be obvious that we have perfected a very simple, practical and inexpensive means and system of lubricating oscillating assemblies of all kinds.

What we claim is:

1. A lubricating means for oscillating machines comprising, a cylindrical housing having a reduced detachable extension, bearings mounted in said detachable extension, revolvable shafts mounted in said detachable extension and journaled in said bearings, gears on the ends of said shafts, a lubricant reservoir in said extension adjacent said bearings, a lubricant tank secured to the upper portion of the housing, a plurality of individual inlet passages in the upper side walls of the tank, and a discharge opening in the tank and leading to said reservoir to permit passage of the lubricant thereinto when the shafts are driven.

2. The construction defined in claim 1 in which the tank is V-shaped in cross section and is formed with a plurality of outwardly bent flanges on the upper edges of the side walls of the tank for securing it to said housing; the spaces between said flanges forming the inlet passages to permit entrance of lubricant into said tank as the shafts are driven.

3. An oscillating machine including generally horizontally disposed, massive eccentric shaft means; an axially extending housing surrounding said shaft means and forming a reservoir for lubricating fluid; a reduced, axially extending extension for one end of said housing with its lower wall substantially above the lower wall of said housing; bearing means for said shaft means supported adjacent the end of said shaft means and through which said shaft means extends, said shaft means being journaled by said bearing means and extending into said extension axially outward of said bearing means; said extension extending axially beyond said bearing means to provide a lubricating fluid reservoir adjacent said bearing means; drive means on the end of said shaft means for passing through said reservoir in the said extension and splashing lubricating fluid to said bearing means; a lubricant tank secured to the upper portion of the housing having a plurality of inlet means at the upper side portion thereof to permit the entrance of lubricating fluid splashed up by said massive shaft means; and reduced passage means leading from near the lower end of said tank through to said reservoir of the extension to supply lubricating fluid from said tank to said reduced extension.

References Cited in the file of this patent

UNITED STATES PATENTS

| | | |
|---|---|---|
| 1,220,810 | Alquist | Mar. 27, 1917 |
| 1,432,451 | Farris | Oct. 17, 1922 |
| 1,794,921 | Ramsey | Mar. 3, 1931 |